United States Patent
Fedewa

(10) Patent No.: US 10,544,749 B1
(45) Date of Patent: Jan. 28, 2020

(54) INTERNAL COMBUSTION ENGINE CONTROL METHOD

(71) Applicant: DELPHI TECHNOLOGIES IP LIMITED, St. Michael (BB)

(72) Inventor: Andrew Fedewa, Clarkston, MI (US)

(73) Assignee: DELPHI TECHNOLOGIES IP LIMITED (BB)

( * ) Notice: Subject to any disclaimer, the term of this patent is extended or adjusted under 35 U.S.C. 154(b) by 0 days.

(21) Appl. No.: 16/157,206

(22) Filed: Oct. 11, 2018

(51) Int. Cl.
| F02D 7/00 | (2006.01) |
| F02D 41/30 | (2006.01) |
| F02D 41/00 | (2006.01) |
| F02B 1/14 | (2006.01) |
| F02D 41/38 | (2006.01) |

(52) U.S. Cl.
CPC ............ *F02D 41/3017* (2013.01); *F02B 1/14* (2013.01); *F02D 41/008* (2013.01); *F02D 41/38* (2013.01); *F02D 2041/3052* (2013.01); *F02D 2041/389* (2013.01); *F02D 2200/02* (2013.01)

(58) Field of Classification Search
CPC .. F02D 41/402; F02D 41/3035; F02D 41/401; F02D 37/02; F02D 41/2451; F02D 41/3005; F02D 2041/1433; F02D 19/0623; F02D 7/00
See application file for complete search history.

(56) References Cited

U.S. PATENT DOCUMENTS

| 6,230,096 B1* | 5/2001 | Nishimoto ............ F02D 41/009 701/113 |
| 8,997,698 B1 | 4/2015 | Roth et al. |
| 2007/0250255 A1* | 10/2007 | Matekunas ............ F02D 17/02 701/114 |
| 2010/0280701 A1* | 11/2010 | Wang .................... F02D 35/023 701/31.4 |
| 2013/0213349 A1 | 8/2013 | Sellnau et al. |
| 2013/0298554 A1 | 11/2013 | Sellnau |
| 2014/0060486 A1* | 3/2014 | Maezawa ................ F02D 45/00 123/350 |
| 2015/0114339 A1 | 4/2015 | Sellnau et al. |
| 2015/0152817 A1 | 6/2015 | Roth et al. |
| 2017/0107920 A1 | 4/2017 | Roth et al. |

OTHER PUBLICATIONS

Mark Sellnau et al., Development of a Gasoline Direct Injection Compression Ignition (GDCI) Engine, SAE International Journal of Engines, Jul. 2014, pp. 835-851 vol. 7, Issue 2.

* cited by examiner

*Primary Examiner* — Long T Tran
(74) *Attorney, Agent, or Firm* — Joshua M. Haines

(57) ABSTRACT

A method for controlling an internal combustion engine having a plurality of cylinders including a first cylinder and one or more remaining cylinders includes selecting a desired auto-ignition dwell for a first combustion cycle for the first cylinder of the plurality of cylinders. A first fuel mass is provided to the first cylinder which is combusted during the first combustion cycle. An actual auto-ignition dwell for the first combustion cycle which results from the first fuel mass is determined and a dwell error is calculated. The dwell error is used to determine a second fuel mass which provided to the first cylinder and which is combusted during the second combustion cycle.

19 Claims, 5 Drawing Sheets

INTERNAL COMBUSTION ENGINE CONTROL METHOD

STATEMENT REGARDING FEDERALLY SPONSORED RESEARCH OR DEVELOPMENT

This invention was made with government support under Contract No. DE-EE0006839 awarded by the Department of Energy. The government has certain rights in the invention.

TECHNICAL FIELD OF INVENTION

The present invention relates to Gasoline Direct-injection Compression-Ignition engines, more particularly to control of such engines, and still even more particularly to auto-ignition dwell control on a cylinder-by-cylinder basis in such engines.

BACKGROUND OF INVENTION

Gasoline Direct-injection Compression-Ignition (GDCI) is an engine combustion process that shows promise in improving engine emissions performance and efficiency. GDCI provides low-temperature combustion of a gasoline-like fuel for high efficiency, low NOx, and low particulate emissions over the complete engine operating range.

Gasoline-like fuels are formulated to resist autoignition, traditionally relying instead on a spark to initiate combustion. The autoignition properties of gasoline-like fuels require relatively precise control of the engine to maintain robust combustion using compression ignition instead of a spark. Improvements in engine control are desired.

SUMMARY OF THE INVENTION

The present invention provides a method is provided for controlling an internal combustion engine having a plurality of cylinders including a first cylinder and one or more remaining cylinders. The method includes selecting a desired auto-ignition dwell for a first combustion cycle for the first cylinder of the plurality of cylinders, wherein the first combustion cycle precedes a second combustion cycle for the first cylinder; providing a first fuel mass to the first cylinder which is combusted during the first combustion cycle; determining an actual auto-ignition dwell for the first combustion cycle which results from the first fuel mass; calculating a dwell error for the first cylinder from the desired auto-ignition dwell and the actual auto-ignition dwell; using the dwell error to determine a second fuel mass; and providing the second fuel mass to the first cylinder which is combusted during the second combustion cycle. The present invention also provides an engine control system which includes a controller configured to carry out this method. The method and controller configured to carry out this method provides increased robustness of the combustion process of the internal combustion engine.

BRIEF DESCRIPTION OF DRAWINGS

This invention will be further described with reference to the accompanying drawings in which.

DETAILED DESCRIPTION OF INVENTION

As used herein, the terms "charge air" and "air charge" refer to a mixture of gases into which fuel is injected in the combustion chamber. The charge air may include fresh air, recirculated exhaust gas, residual combustion products from a previous combustion event that were not completely expelled from the combustion chamber through an exhaust valve after completion of the combustion event, and exhaust gas rebreathed into the combustion chamber through an exhaust valve that is open for a portion of an intake stroke. As used herein, the term "intake air" refers to air that enters the combustion chamber through an intake valve. The intake air is a mixture of fresh air and recirculated exhaust gas.

Previous work related to operation of a GDCI engine is described in commonly owned U.S. Patent Application Publication 2013/0213349A1 titled "HIGH-EFFICIENCY INTERNAL COMBUSTION ENGINE AND METHOD FOR OPERATING EMPLOYING FULL-TIME LOW-TEMPERATURE PARTIALLY-PREMIXED COMPRESSION IGNITION WITH LOW EMISSIONS", commonly owned U.S. Patent Application Publication 2013/0298554A1 titled "SYSTEM AND METHOD FOR CONDITIONING INTAKE AIR TO AN INTERNAL COMBUSTION ENGINE", commonly owned U.S. Patent Application Publication 2015/0114339A1 titled "COLD START STRATEGY AND SYSTEM FOR GASOLINE DIRECT INJECTION COMPRESSION IGNITION ENGINE", commonly owned U.S. Patent Application Publication 2015/0152817A1 titled "ADAPTIVE INDIVIDUAL-CYLINDER THERMAL STATE CONTROL USING INTAKE AIR HEATING FOR A GDCI ENGINE", commonly owned granted U.S. Pat. No. 8,997,698 titled "ADAPTIVE INDIVIDUAL-CYLINDER THERMAL STATE CONTROL USING PISTON COOLING FOR A GDCI ENGINE", and commonly owned U.S. Patent Application Publication 2017/0107920A1 titled "SUPERVISORY CONTROL OF A COMPRESSION IGNITION ENGINE", the contents of each of which are hereby incorporated by reference in their entirety.

Figure 1:
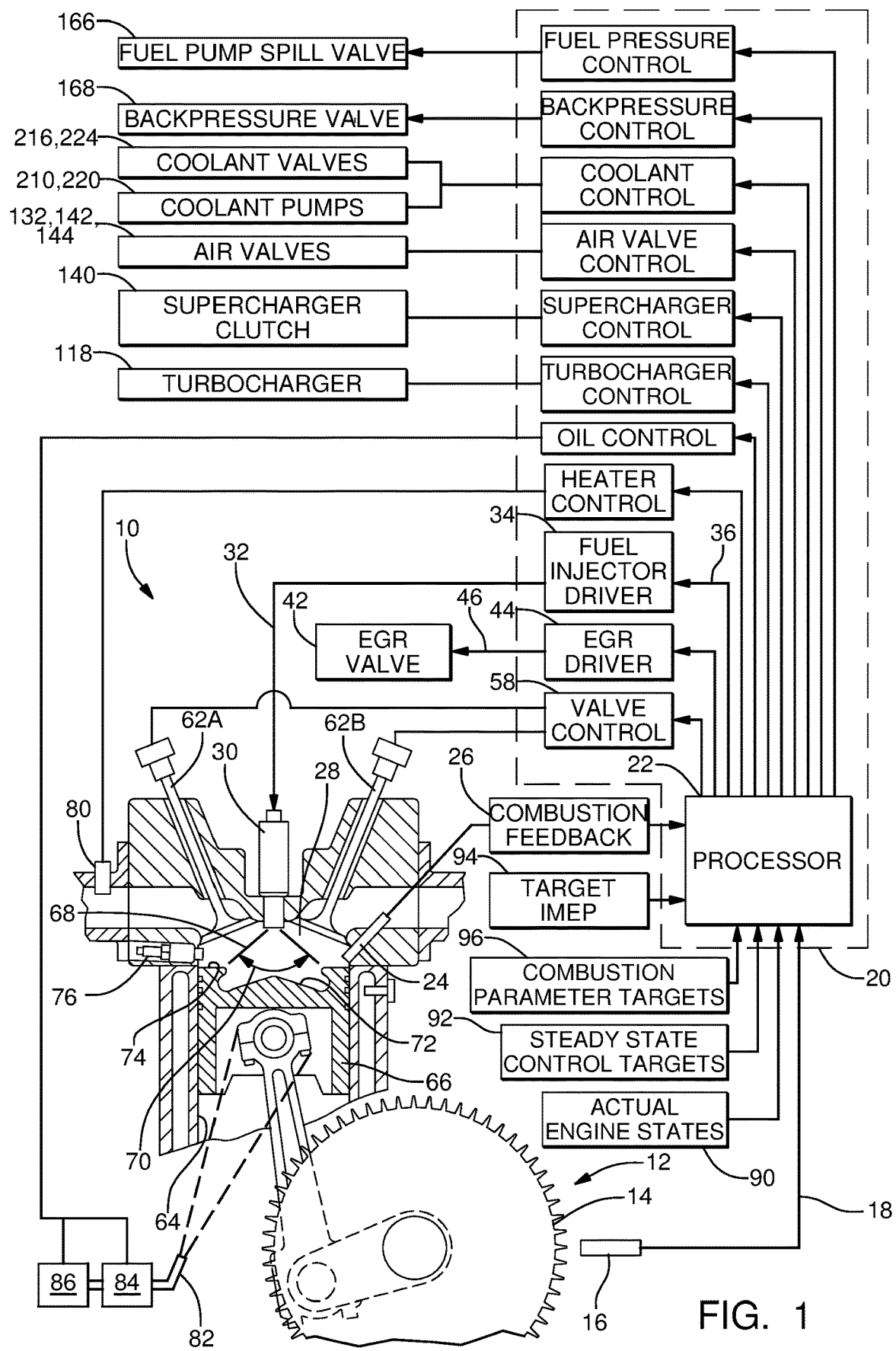
FIG. 1 is a schematic view of an embodiment of an engine control system suitable for controlling a single cylinder of a GDCI engine.

FIG. 1 illustrates a non-limiting embodiment of an engine control system 10 suitable for controlling a GDCI internal combustion engine 12. While only a single cylinder is shown in FIG. 1, it will be appreciated that the elements specific to the single cylinder shown in FIG. 1 are similarly provided to additional cylinders of engine 12. The engine 12 is illustrated as having cylinder 64 containing a piston 66, wherein the region above the piston 66 defines a combustion chamber 28. The system 10 may include a toothed crank wheel 14 and a crank sensor 16 positioned proximate to the crank wheel 14 such that the crank sensor 16 is able to sense rotational movement of the crank wheel teeth and output a crank signal 18 indicative of a crank angle and a crank speed.

The engine control system 10 may also include a controller 20, such as an engine control module (ECM), configured to determine a crank angle and a crank speed based on the crank signal 18. The controller 20 may include a processor 22 or other control circuitry as should be evident to those in the art. The controller 20 or processor 22 may include memory, including non-volatile memory, such as electrically erasable programmable read-only memory (EEPROM) for storing one or more routines, thresholds and captured data. The one or more routines may be executed by the processor 22 to perform steps for determining a prior engine control parameter and scheduling a future engine control signal such that a future engine control parameter corresponds to a desired engine control parameter. FIG. 1 illustrates the processor 22 and other functional blocks as being part of the controller 20. However, it will be appreciated that it is not required that the processor 22 and other functional blocks be assembled within a single housing, and that they may be distributed about the engine 12.

Continuing to refer to FIG. 1, the engine control system 10 may include a combustion sensing means 24 configured to output a combustion signal 26 indicative of a combustion characteristic of a combustion event occurring within the combustion chamber 28. One way to monitor the progress of a combustion event is to determine a heat release rate or cumulative heat release for the combustion event. However, because of the number and complexity of measurements, determining heat release may not be suitable for controlling engines during field use such as when engines are operated in vehicles traveling in uncontrolled environments like public roadways. A combustion detection means suitable for field use may provide an indication of a combustion characteristic that can be correlated to laboratory type measurements such as heat release. Exemplary combustion detection means 24 may include a pressure sensor configured to sense the pressure within the combustion chamber 28. Another device that may be useful for indicating some aspect of the combustion process is a combustion knock sensor. Yet another means for indicating an aspect of the combustion process is ion sensing. The combustion detection means 24 may be any one of the exemplary sensors or other suitable sensor known in the art, or a combination of two or more sensors arranged to provide an indication of a combustion characteristic.

The engine control system 10 includes one or more engine control devices operable to control an engine control parameter in response to an engine control signal, wherein the engine control parameter influences when autoignition initiates and the rate at which autoignition propagates through the combustion chamber 28. One example of an engine control device is a fuel injector 30 adapted to dispense fuel 68 in accordance with an injector control signal 32 output by an injector driver 34 in response to an injection signal 36 output by the processor 22. The fuel injector 30 controls delivery to the combustion chamber 28 of fuel supplied by the fuel injector 30 by a fuel pump, where the pressure of the fuel supplied to the fuel injector 30 is controllable by control of a fuel pump spill valve 166. The fuel injection profile may include a plurality of injection events. Controllable aspects of the fuel injection profile may include how quickly or slowly the fuel injector 30 is turned on and/or turned off, a fuel rate of fuel 68 dispensed by the fuel injector 30 while the fuel injector 30 is on, the initiation timing and duration of one or more fuel injections as a function of engine crank angle, the number of fuel injections dispensed to achieve a combustion event, and/or the pressure at which fuel is supplied to the fuel injector 30 by the fuel pump. Varying one or more of these aspects of the fuel injections profile may be effective to control autoignition.

The exemplary engine control system 10 includes an exhaust gas recirculation (EGR) valve 42. While not explicitly shown, it is understood by those familiar with the art of engine control that the EGR valve regulates a rate or amount of engine exhaust gas that is mixed with fresh air being supplied to the engine to dilute the percentage of oxygen in the air mixture received into the combustion chamber 28 and to change the specific heat of the air charge. The controller 20 may include an EGR driver 44 that outputs an EGR control signal 46 to control the position of the EGR valve 42. In a non-limiting embodiment, the EGR driver may, for example, pulse width modulate a voltage to generate an EGR control signal 46 effective to control the EGR valve to regulate the flow rate of exhaust gases received by the engine 12. In an alternative non-limiting embodiment, the EGR valve may be commanded to a desired position by control of a torque motor actuator.

Referring again to FIG. 1, the engine control system 10 may include other engine management devices. For example, the engine control system 10 may include a turbocharger 118. The turbocharger 118 receives a turbocharger control signal from a turbocharger control block that may control a boost pressure by controlling the position of a waste gate or bypass valve, or by controlling a vane position in a variable geometry turbocharger (VGT). Additionally, the turbocharger waste gate or VGT may be used to control exhaust backpressure in the exhaust manifold. The engine control system 10 may additionally or alternatively include a supercharger which is mechanically driven by the engine through a supercharger clutch 140, the supercharger clutch 140 being controlled by a supercharger control block in the controller 20. Alternatively, the supercharger may be driven by an electric motor controlled by the supercharger control block in the controller. The engine control system 10 may also include a valve control block 58 that may directly control the actuation of engine intake valve 62A and exhaust valve 62B, or may control the phase of a cam (not shown) actuating the intake valve 62A and/or the exhaust valve 62B, or may control the lift duration of the intake valve 62A and/or the exhaust valve 62B.

With continued reference to FIG. 1, the engine control system may include a controllable backpressure valve 168; a plurality of controllable coolant valves 216, 224; a plurality of controllable coolant pumps 210, 220, and a plurality of air valves 132, 142, 144; each of which will be further discussed below. FIG. 1 also indicates additional inputs to the controller 20, including "ACTUAL ENGINE STATE INFORMATION" 90, "STEADY STATE CONTROL TARGETS" 92, "TARGET IMEP" 94, and "COMBUSTION PARAMETER TARGETS" 96, each of which will be further discussed below.

In order to achieve autoignition of the air-fuel mixture over essentially the entire speed-load range of the engine while achieving exceptional fuel consumption, noise, and emissions results, it has been found advantageous to utilize a multiple late-injection, stratified-mixture, low-temperature combustion process. The method of fuel injection is very important for the success of this process. Fuel 68 is injected by the fuel injector 30, where the fuel injector is fed by a fuel rail at a pressure in the range of 100 to 500 bar, late on the compression stroke using a number of distinct injection events to produce a certain state of controlled air-fuel mixture stratification in the combustion chamber 28. The state of stratification in the combustion chamber 28 controls the time at which autoignition occurs and the rate at which it proceeds. Depending on engine speed and load, single-injection, double-injection, triple-injection, quadruple-injection, quintuple-injection, or higher order strategies may be used. The quantity and timing of each injection is important and must be optimized for best results. Fuel may be injected late on the compression stroke and generally in the range 100 crank angle degrees before top dead center to 10 crank angle degrees after top dead center under most operating conditions, but other conditions may require injection timing outside this range.

In the non-limiting embodiment shown in FIG. 1, the combustion chamber 28 is defined in part by the top surface 74 of the piston 66. The piston 66 is configured so as to define a bowl 72 symmetrically located below the centrally mounted fuel injector 30. The injector is configured to inject fuel 68 over a spray angle 70. The engine 12 may also be equipped with an ignition source such as a spark plug 76 to assist with initial engine starting.

Still with reference to FIG. 1, the engine control system 10 may include one or more intake air heaters 80 configured to heat air at the intake manifold or intake port of each cylinder. Each intake air heater 80 is controllable by a control signal received from an intake air heater control block in a manner to be discussed in further detail below.

Also indicated in FIG. 1 is a nozzle 82 configured to spray oil onto the bottom of the piston 66 to provide cooling of the piston 66. Oil flow to the nozzle 82 is provided by an oil pump 86 that supplies oil to the nozzle 82 through an oil control valve 84. Control of the oil pump 86 and/or of the oil control valve 84 is provided through an oil control block in the controller 20 in a manner to be discussed in further detail below.

Although not specifically indicated in FIG. 1, the engine control system 10 may include additional sensors to measure temperature and/or pressure and/or oxygen concentration and/or humidity at locations within the air intake system and/or the engine exhaust system, which may be included in the "ACTUAL ENGINE STATES" block 90. Also, it is to be noted that the embodiment depicted in FIGS. 1-3 may contain components that are not essential to operate a GDCI engine but may offer benefits if included in an implementation of a GDCI engine system.

Figure 2:
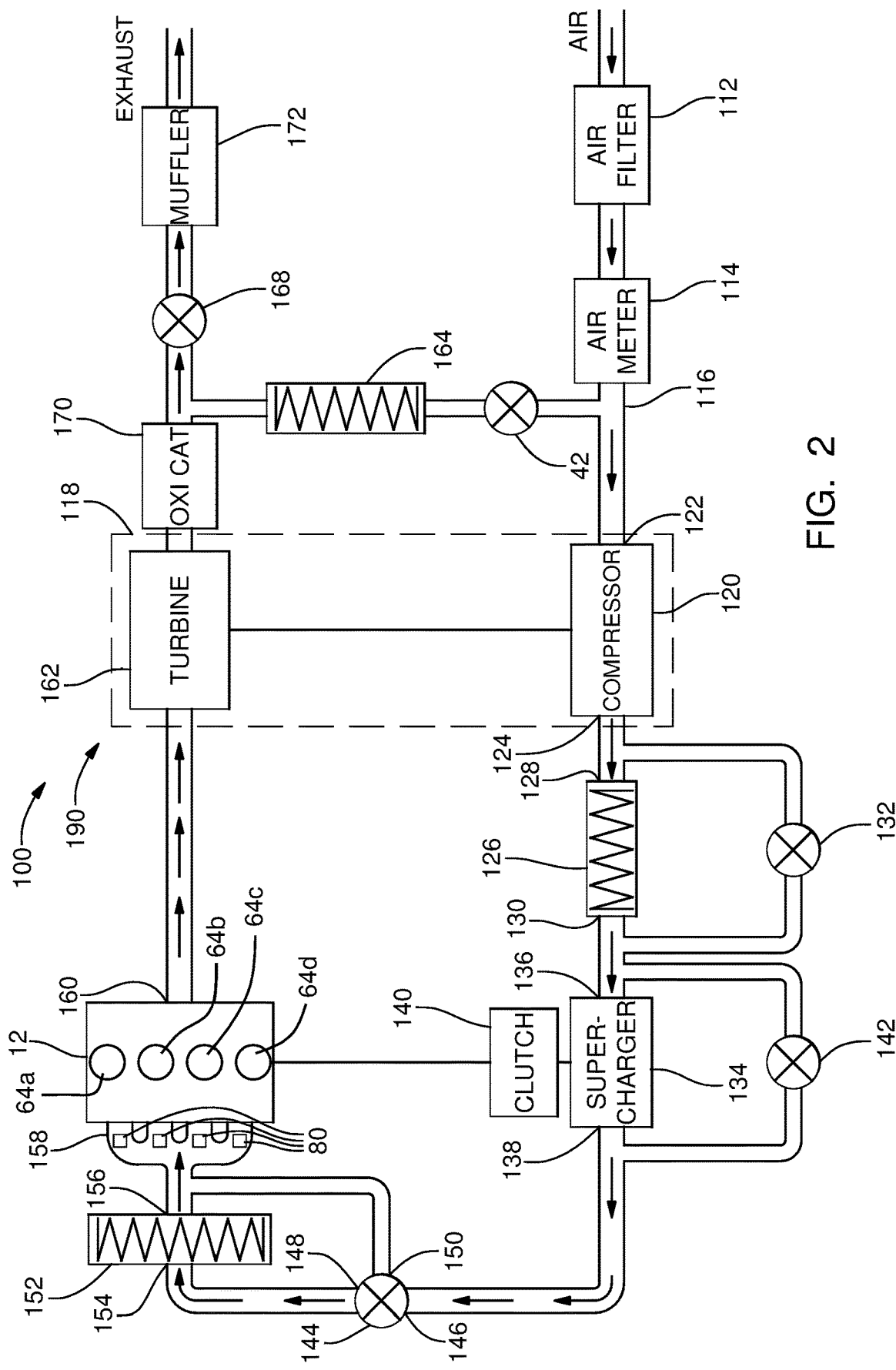
FIG. 2 is a block diagram of an embodiment of the gas (air and/or exhaust) paths of an engine system.

FIG. 2 is a block diagram of a non-limiting embodiment of the gas paths 190 of a system 100 for conditioning intake air into the engine 12 of FIG. 1. This diagram depicts the routing and conditioning of gases (e.g. air and exhaust gas) in the system. It will be appreciated that configurations other than that shown in FIG. 2, for example a configuration using a single air cooler or a configuration with fewer bypass valves, may be feasible.

Referring to FIG. 2, air passes through an air filter 112 and a mass airflow sensor (air meter) 114 into an air duct 116. The air duct 116 channels air into the air inlet 122 of the compressor 120 of a turbocharger 118. Air is then channeled from the air outlet 124 of the compressor 120 to the air inlet 128 of a first charge air cooler 126. The air outlet 130 of the first charge air cooler 126 is connected to the air inlet 136 of a supercharger 134. A first charge air cooler bypass valve 132 is connected between the air inlet 128 and the air outlet 130 of the first charge air cooler 126 to controllably divert air around the first charge air cooler 126.

Continuing to refer to FIG. 2, air at the air outlet 130 of the first charge air cooler 126 is channeled to the air inlet 136 of a supercharger 134, which is driven by the engine 12 through a controllable clutch 140. A controllable supercharger bypass valve 142 is indicated in FIG. 2, allowing air to bypass the supercharger 134. The air from the air outlet 138 of the supercharger 134 or from the supercharger bypass valve 142 is channeled to a first port 146 of a second charge air cooler bypass valve 144. Alternatively, air from air outlet of supercharger 134 is channeled to a first port 146 of a second charge air cooler bypass valve 144 and to the supercharger bypass valve 142 and back to inlet 136 of supercharger 134. The second charge air cooler bypass valve 144 in FIG. 2 allows air entering the first port 146 to be controllably channeled to the second port 148, to the third port 150, or to be blended to both the second port 148 and to the third port 150. Air that is channeled through the second port 148 of the second charge air cooler bypass valve 144 enters an air inlet port 154 of a second charge air cooler 152, through which the air passes by way of an air outlet port 156 of the second charge air cooler 152 to an air intake manifold 158 of the engine 12. Air that is channeled through the third port 150 of the second charge air cooler bypass valve 144 passes directly to the air intake manifold 158 of the engine 12 without passing through the second charge air cooler 152. A plurality of intake air heaters 80 is shown disposed in the air intake manifold 158, with each intake air heater 80 configured to heat air at the intake port of a cylinder of the engine 12. Alternatively, a single heat source may be disposed in the intake manifold 158 so as to heat air supplied to all of the intake ports of the engine 12.

Still with reference to FIG. 2, engine exhaust gas exits an exhaust port 160 of the engine 12 and is channeled to the turbine 162 of the turbocharger 118. Exhaust gas exiting the turbine 162 passes through a catalytic converter 170. Upon exiting the catalytic converter 170, the exhaust gas can follow one of two paths. A portion of the exhaust gas may pass through an EGR cooler 164 and an EGR valve 42, to be reintroduced into the intake air stream at air duct 116. The remainder of the exhaust gas that is not recirculated through the EGR system passes through a backpressure valve 168 and a muffler 172, to be exhausted out a tail pipe.

Figure 3:
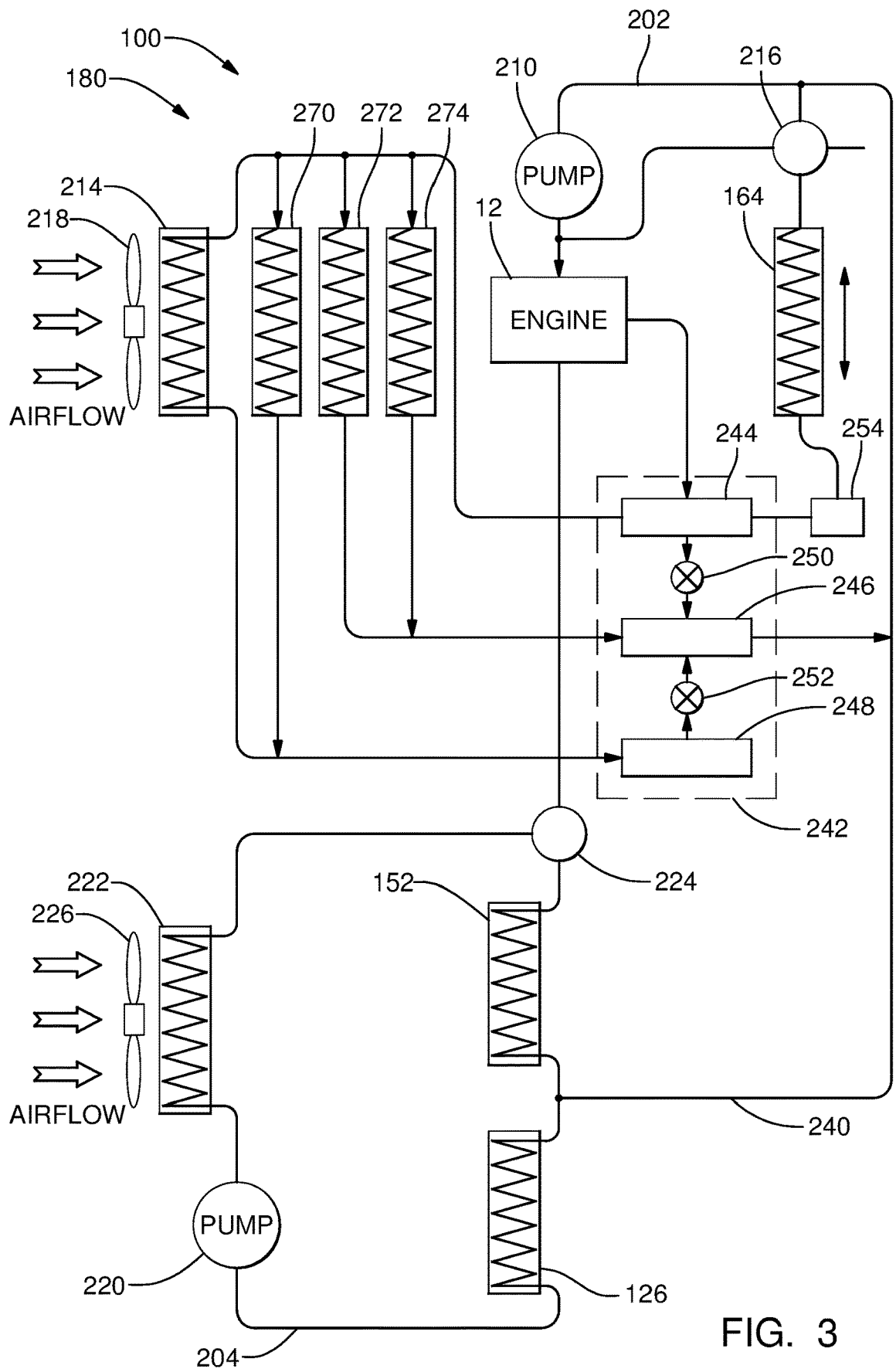
FIG. 3 is a block diagram of an embodiment of the coolant paths of an engine system.

It will be appreciated from the foregoing description of FIG. 2 that the focus of FIG. 2 is on the transport and conditioning of gas constituents, i.e. air into the engine 12 and exhaust gas out of the engine 12. Some of the components in FIG. 2 affect the temperature and/or the pressure of the gas flowing through the component. For example the turbocharger compressor 120 and the supercharger 134 each increase both the temperature and the pressure of air flowing therethrough. The first charge air cooler 126, the second charge air cooler 152, and the EGR cooler 164 are each heat exchangers that affect the temperature of the gas (air or exhaust gas) flowing therethrough by transferring heat between the gas and another medium. In the embodiment of FIGS. 2 and 3, the other heat transfer medium is a liquid coolant, discussed in further detail in relation to FIG. 3. In an alternate embodiment, a gaseous coolant may be used in lieu of a liquid coolant.

FIG. 3 depicts a non-limiting embodiment of coolant paths 180 of the system 100 for conditioning intake air into an engine 12. FIG. 3 includes several components such as the engine 12, the first charge air cooler 126, the second charge air cooler 152, and the EGR cooler 164 that were previously discussed with respect to their functions in the gas paths 190 of the system 100 depicted in FIG. 2. The coolant system 180 may further include an oil cooler 270, a heat exchanger 272 to provide cooling for the turbocharger 118 and a heater core 274, a temperature sensing device, a pressure sensing device, and/or other components not shown in FIG. 2.

Referring to FIG. 3, the coolant paths 180 of the system 100 for conditioning intake air includes a first coolant loop 202. The first coolant loop 202 includes a first coolant pump 210 configured to urge liquid coolant through coolant passages in the engine 12 and through a first radiator 214. The first coolant pump 210 may conveniently be a mechanical pump driven by rotation of the engine 12 or an electric pump. The first radiator 214 may conveniently be a conventional automotive radiator with a controllable first air supply means 218 configured to urge air over the first radiator 214. Preferably the first air supply means 218 comprises a variable speed fan, but the first air supply means 218 may alternatively comprise, by way of non-limiting example, a single speed fan, a two speed fan, a fan of any sort in conjunction with one or more controllable shutters, or the like, without departing from the inventive concept.

Continuing to refer to FIG. 3, the coolant paths 180 of the system 100 includes a thermostat crossover assembly 242 within which is defined a first chamber 244, a second chamber 246, and a third chamber 248. A first thermostat 250 allows fluid communication between the first chamber 244 and the second chamber 246 when the temperature of the coolant at the first thermostat 250 is within a first predetermined range. A second thermostat 252 allows fluid communication between the third chamber 248 and the second chamber 246 when the temperature of the coolant at the second thermostat 252 is within a second predetermined range. It will be appreciated that, while the first chamber 244, the second chamber 246, the third chamber 248, the first thermostat 250, and the second thermostat 252 are depicted as housed in a common enclosure, these components may be otherwise distributed within the system 180 without departing from the inventive concept.

The embodiment depicted in FIG. 3 further includes the EGR cooler 164, one coolant port of which is connected to an optional four-way coolant valve 216. The other coolant port of EGR cooler 164 is fluidly coupled to the first chamber 244 through an orifice 254.

Continuing to refer to FIG. 3, the coolant paths 180 of the system 100 further includes a second coolant loop 204. The second coolant loop 204 includes a controllable second coolant pump 220 configured to urge liquid coolant through a second radiator 222, a three-way coolant valve 224, the second charge air cooler 152, and the first charge air cooler 126. The second radiator 222 may conveniently be a conventional automotive radiator with a controllable second air supply means 226 configured to urge air over the second radiator 222. Preferably the second air supply means 226 comprises a variable speed fan, but the second air supply means 226 may alternatively comprise, by way of non-limiting example, a single speed fan, a two speed fan, a fan of any sort in conjunction with one or more controllable shutters, or the like, without departing from the inventive concept. Alternately, the second radiator 222 may be positioned in line with the first radiator 214 such that the first air supply means 218 urges air over both the second radiator 222 and the first radiator 214, in which case the second air supply means 226 would not be required.

Coolant communication between the first coolant loop 202 and the second coolant loop 204 is enabled by an optional three-way coolant valve 224 and a conduit 240. Control of the four-way coolant valve 216, the three-way coolant valve 224, and/or the second coolant pump 220 may be employed to achieve desired temperature conditioning of intake air.

In the preceding discussion relative to FIGS. 1 through 3, it will be appreciated that the engine control system 10 and the system 100 for conditioning intake air contain several components and subsystems that can influence the temperature and pressure and exhaust gas concentration within the combustion chamber 28. Of these components and subsystems, there are several that have a global effect on the temperature and/or pressure in all cylinders of a multi-cylinder engine.

The turbocharger 118, the supercharger 134, the charge air coolers 126 and 152, the air bypass valves 132, 142, and 146, the EGR cooler 164, the EGR valve 42, the coolant pumps 210, 220, the coolant valves 216, 224, and the intake and exhaust valves 62A, 62B can be considered "global" components in that they each influence the temperature and/or pressure and/or exhaust gas concentration in the combustion chambers 28 of the engine 12, with the temperature and/or pressure and/or exhaust gas concentration in all combustion chambers 28 of a multi-cylinder engine 12 moving in the same direction as a result of a change in the control setting of one of these "global" components.

The GDCI combustion process has demonstrated very high thermal efficiency and very low NOx and particulate matter emissions. The GDCI combustion process includes injecting gasoline-like fuel into the cylinder with appropriate injection timing to create a stratified mixture with varying propensity for autoignition. Heat and pressure from the compression process produces autoignition of the air/fuel mixture in the cylinder with burn duration long enough to keep combustion noise low, but with combustion fast enough to achieve high expansion ratio for all fuel that is burned. Fuel injection into each combustion chamber 28 is tailored to optimize the combustion achieved in that combustion chamber 28, as measured by the combustion sensing means 24 associated with that combustion chamber 28. Unlike the "global" components discussed above, the injection of fuel can be controlled to influence the robustness of combustion on a cylinder-by-cylinder basis. Other controls, such as spark plug 76, intake air heaters 80, and piston coolers 82 provide individual cylinder control as well, as will be discussed in further detail below. Alternative embodiments of control actuators for intake valves 62A and exhaust valves 62B may also provide individual cylinder-by-cylinder control.

A particular challenge in GDCI combustion is maintaining robust combustion in each combustion chamber. Gasoline-like fuel has characteristics such that it is resistant to autoignition. As a result, unlike a conventional spark ignition gasoline engine, a GDCI engine requires relatively tight control of the in-cylinder pressure and temperature to robustly achieve and maintain compression ignition.

A multi-cylinder engine presents challenges in matching the characteristics that are important to maintaining robust and stable compression ignition with gasoline-like fuel. It is known that all cylinders of a multi-cylinder internal combustion engine do not operate at precisely the same conditions. Compression ratio may vary from cylinder-to-cylinder due to manufacturing tolerances, wear, or deposits in a combustion chamber. Temperature may vary from cylinder to cylinder due to differences in heat transfer from the cylinder to the coolant and to ambient air, for example with middle cylinders operating hotter than outer cylinders. Air flow into each combustion chamber may differ due to intake manifold geometry, and exhaust flow out of each combustion chamber may differ due to exhaust manifold geometry. Other sources of variability may include differences in fuel delivery amount or spray pattern due to tolerances associated with the fuel injector 30. While control of the "global" components discussed above may be useful to achieve a desired minimum temperature, desired average temperature, or desired maximum temperature under steady-state conditions, the "global" systems are not able to compensate for the cylinder-to-cylinder differences that impede achieving optimal conditions in all cylinders of a multi-cylinder engine. Additionally, under transient engine operating conditions, i.e. changing engine speed and/or load, the response time of the "global" components to influence combustion chamber temperature may be too slow to allow robust and stable GDCI combustion during the time that the engine is transitioning from one speed/load state to another.

The level to which the air-fuel mixture is premixed in combustion chamber 28 is highly dependent on the auto-ignition dwell duration and the auto-ignition dwell duration is a function of many parameters such as in-cylinder pressure (due to boost), in-cylinder temperature (due to rebreathed exhaust, boost, etc.), oxygen content (due to EGR and rebreathed exhaust), and engine speed. As used herein, auto-ignition dwell is defined to be the angular distance (in crank angle degrees) between the end of the last fuel injection and the start of combustion for a given combustion. The start of combustion angle is defined as the crank angle at which the combustion heat release reaches a pre-defined percentage of the total heat release for that combustion cycle. Furthermore, the in-cylinder air-fuel mixture must be kept stratified, i.e. a partially pre-mixed state, to maintain the advantages of GDCI combustion over diesel and HCCI. Differences in auto-ignition dwell exist from cylinder to cylinder due to, by way of non-limiting example only, thermal gradients across the engine and imperfect distribution of EGR and rebreathed exhaust. Most parameters which affect auto-ignition dwell are global and thus cannot be used to account for differences in auto-ignition dwell between cylinders. The Inventor has developed a method which is used to alter auto-ignition dwell based on the principle that fuel mass, i.e. fuel mass delivered to the combustion chamber for a combustion event, has a strong influence on auto-ignition dwell where increased fuel mass decreases auto-ignition dwell which is likely due to change in local equivalence ratio, and conversely, decreased fuel mass increases auto-ignition dwell. Since delivery of fuel is not a global parameter, i.e. fuel can be uniquely delivered to each cylinder, control of auto-ignition dwell of individual cylinders may be accomplished. The method will be described in the paragraphs that follow.

Figure 4:
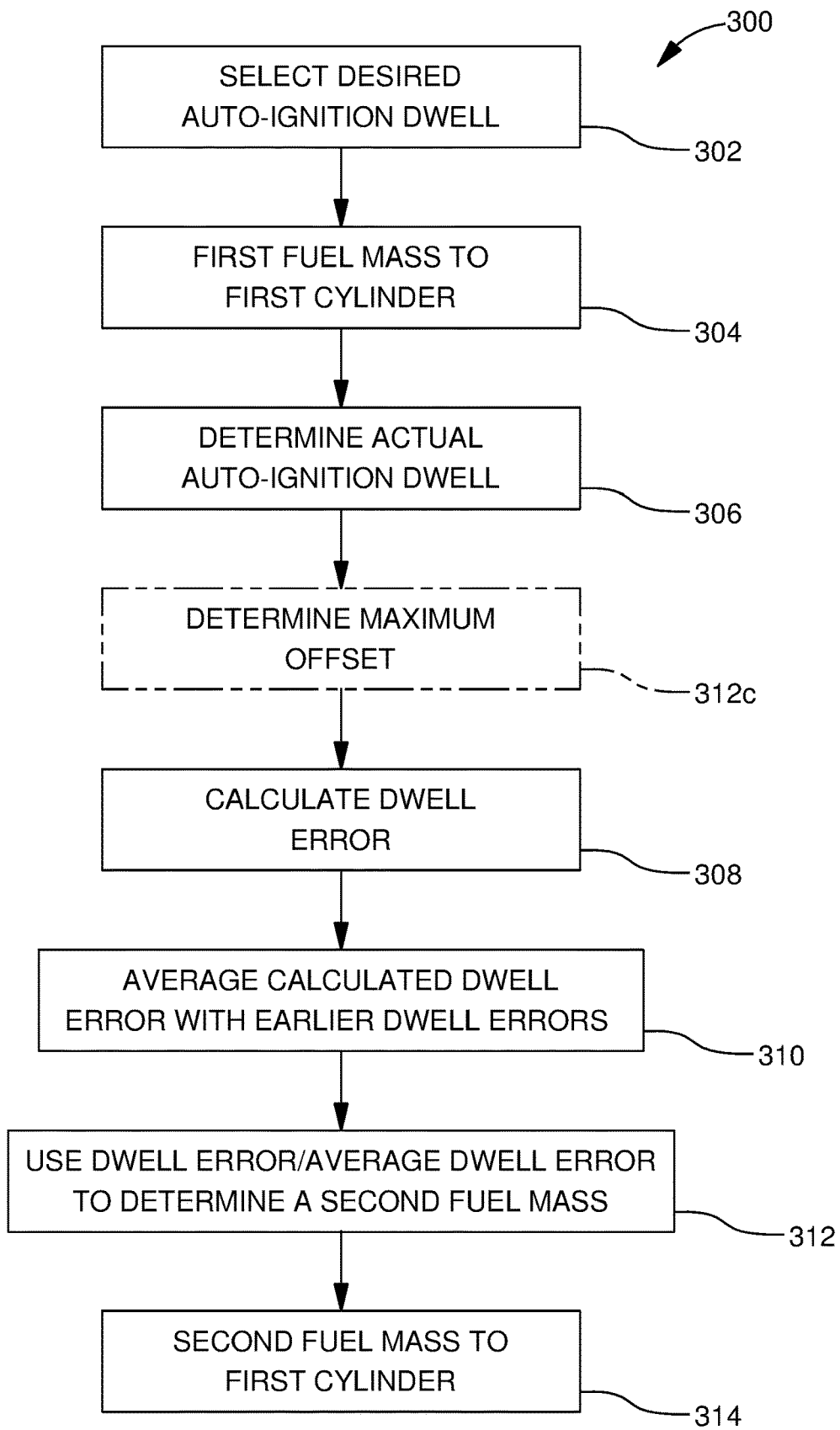
FIG. 4 is a flowchart depicting a method for providing individual auto-ignition dwell control to the GDCI engine.

With additional reference to FIG. 4, a method 300 is illustrated for providing individual auto-ignition dwell control. Method 300 is directed toward providing individual auto-ignition dwell control in a first cylinder 64a of engine 12 with one or more remaining cylinders 64b, 64c, 64d. While the description herein will directed to providing individual auto-ignition dwell control in first cylinder 64a, it should be understood that method 300 is equally applicable provide individual auto-ignition dwell control of each of remaining cylinders 64b, 64c, 64d in addition to first cylinder 64a. It is noted that first cylinder 64a and the one or more remaining cylinders are depicted in FIG. 2 and are each substantially identical to cylinder 64 and its related components described earlier. In a first step 302, a desired auto-ignition dwell for first cylinder 64a for a first combustion cycle is selected. The desired auto-ignition dwell may be selected from a table stored in controller 20 and selected based on commanded torque and speed of engine 12 together with other current and expected operating conditions. In a second step 304, a first fuel mass is provided to first cylinder 64a, i.e. the first fuel mass is injected into first cylinder 64a using fuel injector 30, such that the first fuel mass is combusted during the first combustion cycle. The first fuel mass may be selected based on, for example, desired engine torque and speed, from a table stored in controller 20. In a third step 306, an actual auto-ignition dwell is determined from the first combustion cycle which results from the first fuel mass. The actual auto-ignition dwell may be determined based on combustion feedback, for example, from combustion signal 26 provided by combustion sensing means 24. In a fourth step 308, a dwell error is calculated for first cylinder 64a from the desired auto-ignition dwell and the actual auto-ignition dwell where the dwell error is simply the difference between the desired auto-ignition dwell and the actual auto-ignition dwell, a calculation which may be performed, by way of non-limiting example, by controller 20. In a fifth step 310 which is optional, the dwell error calculated in fourth step 308 may be averaged with one or more earlier dwell errors calculated from earlier combustion cycles to determine an average dwell error. In a sixth step 312, the dwell error is used to determine a second fuel mass which will be used in a second combustion cycle of first cylinder 64a where the second combustion cycle follows the first combustion cycle. In the case that fifth step 310 is used, the average dwell error is used to determine the second fuel mass, and since the dwell error calculated in fourth step 308 is included in the average dwell error, the dwell error calculated in fourth step 308 is used to determine the second fuel mass by virtue of being included in the average dwell error. In a seventh step 314, the second fuel mass is provided to first cylinder 64a, i.e. the second fuel mass is injected into first cylinder 64a using fuel injector 30, such that the second fuel mass is combusted during the second combustion cycle on first cylinder 64a.

Figure 5:
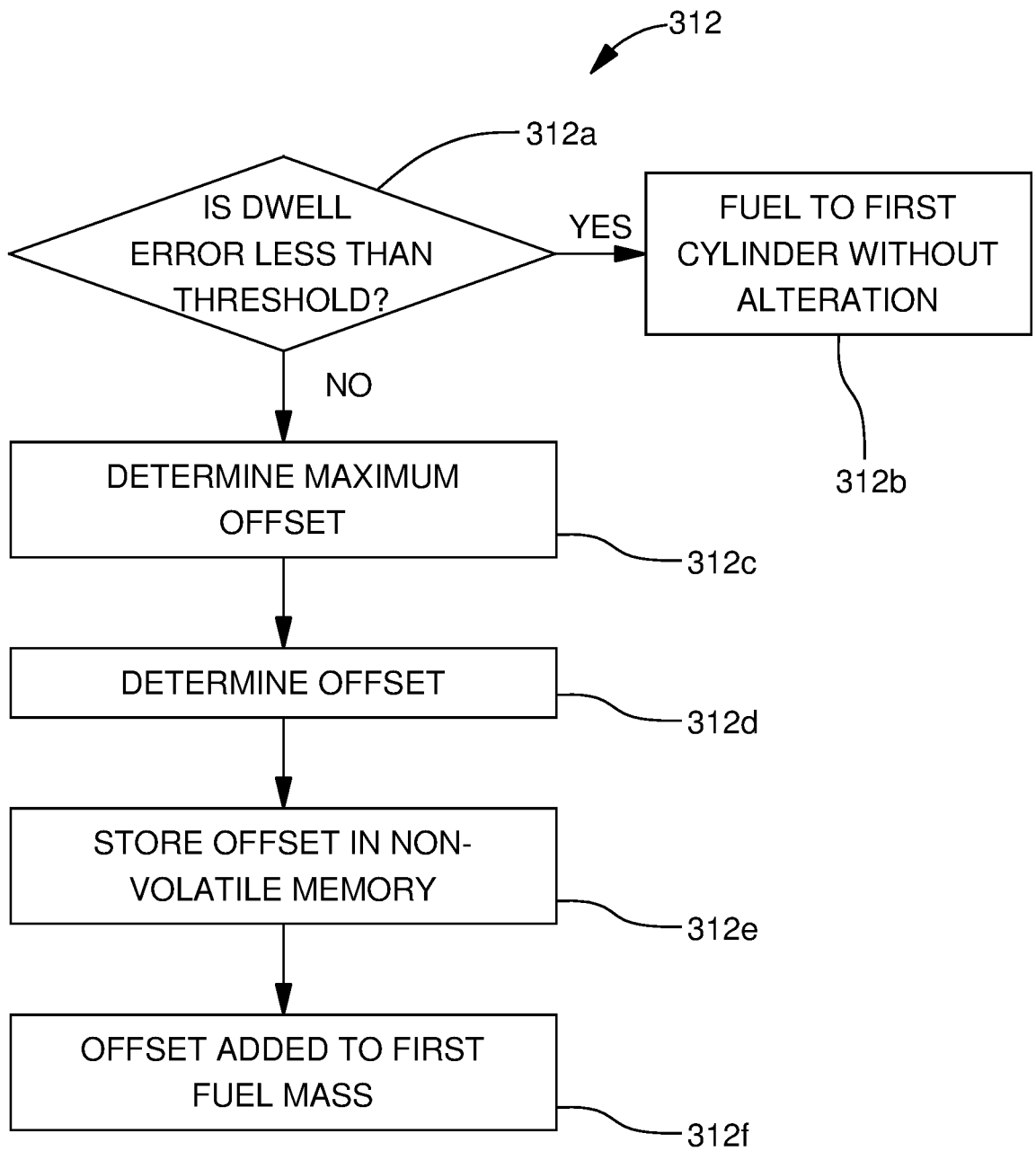
FIG. 5 is a flowchart depicting detail of using dwell error of the method of FIG. 4 to determine a second fuel mass.

Now with additional reference to FIG. 5, sixth step 312 in which the second fuel mass is determined will be described in greater detail. Sixth step 312 includes a first sub-step 312a in which the dwell error or average dwell error is compared to a threshold. If the dwell error or average dwell error is less than or equal to the threshold, the method proceeds to a second sub-step 312b where fuel may be supplied to first cylinder 64a without alteration. The threshold may be predetermined and stored in controller 20, and furthermore, the threshold may be the result of empirical testing or modeling. Alternatively, if the dwell error or average dwell error is greater than the threshold, the method proceeds to a third sub-step 312c where a maximum offset is determined based on the offsets used in one or more of remaining cylinders 64b, 64c, 64d (which are stored in non-volatile memory such as in controller 20) because the total of all offsets must be within a predetermined offset range so that the total fuel mass for all cylinders is close to the desired total fuel mass for all cylinders 64a, 64b, 64c, 64d. The predetermined offset range may be determined from empirical testing or modeling. It should be noted that third sub-step 312c may be performed after fourth step 308, but may alternatively be performed prior to fourth step 308 since the details needed to determine the maximum offset will already be known, i.e. the offsets used in the one or more remaining cylinders 64b, 64c, 64d which are each a function of speed and load of engine 12. It should also be noted that third sub-step 312c is illustrated in phantom lines in FIG. 4 to illustrate that third sub-step 312c may alternatively be performed prior to fourth step 308, however, it should be understood that third sub-step 312c need not be carried out more than once within one iteration of method 300 for first cylinder 64a. Next, in a fourth sub-step 312d, the offset is determined, for example, by multiplying the dwell error or average dwell error with a gain to determine a product and then adding a previous offset, e.g. the offset most recently previously determined, of first cylinder 64a where these computations may be carried out in controller 20. Furthermore, the gain may be determined from empirical testing or modeling and stored in controller 20 where it should be noted that the gain is a calibration that does not change over time. If the resulting offset, i.e. the previous offset plus the product of the dwell error and the gain, exceeds the maximum offset, the offset will be limited to the maximum offset. It should be noted that in the case where third sub-step 312c is performed prior to fourth step 308, first sub-step 312a proceeds directly to third sub-step 312c. After the offset is determined in fourth sub-step 312d, the offset is stored in non-volatile memory in a fifth sub-step 312e. Next, in a sixth sub-step 312f, the offset is added to the first fuel mass to arrive at the second fuel mass.

The method 300 for auto-ignition dwell control on a cylinder-by-cylinder basis provides increased robustness of the GDCI combustion process for engine 12, however, may also be beneficial to other combustion strategies.

While this invention has been described in terms of preferred embodiments thereof, it is not intended to be so limited, but rather only to the extent set forth in the claims that follow.

I claim:

1. A method for controlling an internal combustion engine having a plurality of cylinders including a first cylinder and one or more remaining cylinders, said method comprising the steps of:
selecting a desired auto-ignition dwell for a first combustion cycle for said first cylinder of said plurality of cylinders, wherein said first combustion cycle precedes a second combustion cycle for said first cylinder;
providing a first fuel mass to said first cylinder which is combusted during said first combustion cycle;
determining an actual auto-ignition dwell for said first combustion cycle which results from said first fuel mass;
calculating a dwell error for said first cylinder from said desired auto-ignition dwell and said actual auto-ignition dwell;
using said dwell error to determine a second fuel mass; and
providing said second fuel mass to said first cylinder which is combusted during said second combustion cycle.

2. A method as claimed in claim 1, wherein said method further comprises:
averaging said dwell error with one or more dwell errors from one or more combustion cycles of said first cylinder which precede said first combustion cycle to determine an average dwell error; and
using said average dwell error to determine said second fuel mass.

3. A method as claimed in claim 1, wherein said second fuel mass is the sum of said first fuel mass and an offset.

4. A method as claimed in claim 3, further comprising:
determining a maximum offset; and
limiting said offset to be less than or equal to said maximum offset.

5. A method as claimed in claim 4, wherein determining said maximum offset comprises using one or more offsets from said one or more remaining cylinders.

6. A method as claimed in claim 5, wherein the total of said offset and said one or more offsets from said one or more remaining cylinders is within a predetermined offset range.

7. A method as claimed in claim 5, wherein determining said maximum offset occurs after determining said actual auto-ignition dwell for said first combustion cycle.

8. A method as claimed in claim 7, wherein determining said maximum offset occurs before calculating said dwell error for said first cylinder.

9. A method as claimed in claim 5, wherein said one or more offsets from said one or more remaining cylinders is stored in nonvolatile memory.

10. A method as claimed in claim 5, wherein said one or more offsets from said one or more remaining cylinders is each of function of speed and load of said internal combustion engine.

11. A method as claimed in claim 4, wherein said offset is stored in nonvolatile memory.

12. A method as claimed in claim 3, wherein said offset is determined by multiplying said dwell error with a gain to determine a product and then adding a previous offset to said product, wherein said previous offset is from a previous combustion cycle which occurs prior to said first combustion cycle.

13. A method as claimed in claim 3, further comprising storing said offset in nonvolatile memory.

14. An engine control system for controlling an internal combustion engine having a plurality of cylinders including a first cylinder and one or more remaining cylinders, said engine control system comprising:
a controller configured to communicate with said internal combustion engine, said controller being configured to:
select a desired auto-ignition dwell for a first combustion cycle for said first cylinder of said plurality of cylinders, wherein said first combustion cycle precedes a second combustion cycle for said first cylinder;
provide a first fuel mass to said first cylinder which is combusted during said first combustion cycle;
determine an actual auto-ignition dwell for said first combustion cycle which results from said first fuel mass;
calculate a dwell error for said first cylinder from said desired auto-ignition dwell and said actual auto-ignition dwell;
use said dwell error to determine a second fuel mass; and
provide said second fuel mass to said first cylinder which is combusted during said second combustion cycle.

15. An engine control system as claimed in claim 14 wherein, said controller is further configured to:
average said dwell error with one or more dwell errors from one or more combustion cycles of said first cylinder which precede said first combustion cycle to determine an average dwell error; and
use said average dwell error to determine said second fuel mass.

16. An engine control system as claimed in claim 14, wherein said second fuel mass is the sum of said first fuel mass and an offset.

17. An engine control system as claimed in claim 16, wherein said controller is further configured to:
determine a maximum offset; and
limit said offset to be less than or equal to said maximum offset.

18. An engine control system as claimed in claim 17, wherein said controller is further configured to use one or more offsets from said one or more remaining cylinders to determine said maximum offset.

19. An engine control system as claimed in claim 16, wherein said controller is further configured to determine said offset by multiplying said dwell error with a gain to determine a product and then add a previous offset to said product, wherein said previous offset is from a previous combustion cycle which occurs prior to said first combustion cycle.

\* \* \* \* \*